(12) United States Patent
Kweon et al.

(10) Patent No.: US 6,314,209 B1
(45) Date of Patent: *Nov. 6, 2001

(54) VIDEO INFORMATION CODING METHOD USING OBJECT BOUNDARY BLOCK MERGING/SPLITTING TECHNIQUE

(75) Inventors: Ji-Heon Kweon; Joo-Hee Moon, both of Seoul (KR)

(73) Assignee: Hyundai Electronics Industries, Co., Ltd., Ichon (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,541

(22) Filed: Jul. 8, 1997

(30) Foreign Application Priority Data

| Jul. 8, 1996 | (KR) | 96-27766 |
| Jul. 8, 1996 | (KR) | 96-27767 |
| Sep. 5, 1996 | (KR) | 96-38406 |
| Feb. 17, 1997 | (KR) | 97-04738 |
| Feb. 17, 1997 | (KR) | 97-04739 |

(51) Int. Cl.[7] ............................................. G06K 9/36
(52) U.S. Cl. ..................... 382/243; 382/232; 382/284
(58) Field of Search ............................... 382/203, 266, 382/267, 268, 272, 275, 284, 232, 236, 243

(56) References Cited

U.S. PATENT DOCUMENTS 5,185,808 * 2/1993 Cok .
5,321,773 * 6/1994 Kopec et al. ........................ 382/30

* cited by examiner

Primary Examiner—Matthew C. Bella
(74) Attorney, Agent, or Firm—Bryan Cave LLP

(57) ABSTRACT

An improved video information coding method for an object boundary block merging/splitting technique which makes it possible to use an object boundary block merging and a merging/separation as a reverse process thereof which are capable of enhancing a coding efficiency by using a space surplus of an intra-video and inter-video which exist in a block or a neighboring block by merging, coding and transmitting the BBM. The method includes the steps of merging a plurality of object boundary objects, judging whether there is an overlapped block signal among the block signals using shape information of the object boundary blocks, and merging the blocks in which no overlapped pixels exist as a result of the judgement.

12 Claims, 17 Drawing Sheets

VOP

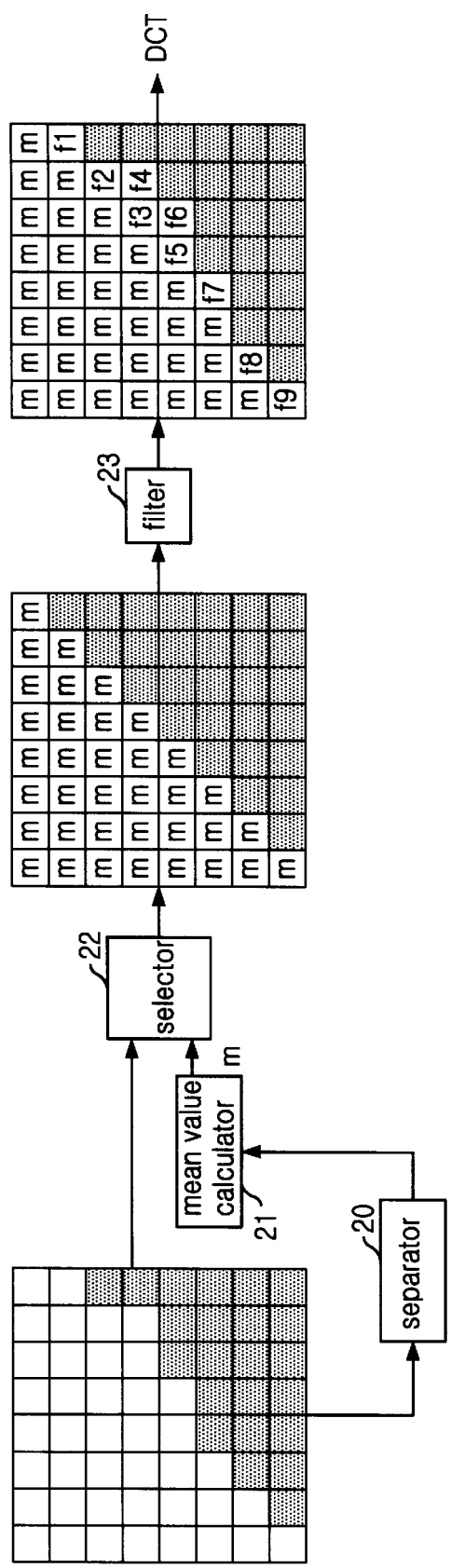

FIG. 13A, FIG. 13B, FIG. 13C, FIG. 13D, FIG. 13E, FIG. 13F, FIG. 13G, FIG. 13H, FIG. 13I

VIDEO INFORMATION CODING METHOD USING OBJECT BOUNDARY BLOCK MERGING/SPLITTING TECHNIQUE

BACKGROUND OF THE INVENTION

1. Field of the Invention

The present invention relates to a video information coding method using an object boundary block merging/splitting technique, and in particular, to an improved video information coding method using an object boundary block merging/splitting technique which makes it possible to more effectively merge and code an object boundary block using a space surplus of a video or between videos existing in a block or between blocks and split the video through an object block splitting technique for a reconstruction of a recovering video and a display.

2. Description of the Conventional Art

Recently, the MPEG (Motion Picture Experts Group) which introduced an MPEG-I and MPEG-II which are an international standard recommendation with respect to a video and audio coding technique and system construction plans to introduce in 1998 an MPEG-IV to be used as a new international standard recommendation with respect to a new generation video and audio coding technique and system construction.

The MPEG-IV is directed to supporting a next generation video and audio application which can not be supported by the previous MPEGs.

In addition, the MPEG-IV includes a new technique for a communication and connection of a video and audio data, for example, an object-based interactive function and connection function through a network having a different characteristic.

Furthermore, it is possible to provide a characteristic by which the system operates under a predetermined communication environment such as an erroneous communication environment and a low transmission ratio.

Moreover, it is possible to code and control a natural video and audio and an artificial video and audio by using a computer graphic technique.

Namely, the MPEG-IV is capable of supporting many functions required in various applicable fields.

Therefore, the MPEG-IV may provide an open structure which is capable of supporting functions required for low cost and high-tech applicable fields as the multimedia technique advances and expandable functions.

Among the functions, there is known a function of enhancing a compression efficiency for a coding effect which is needed for a transmission and storing function and cost reduction.

As applicable fields with respect to the MPEG-IV, there are known a NDB (Networked Database Service) using an IMM (Internet Multimedia), an IVG (Interactive Video Games), an IPC (Interpersonal Communications), an ISM (Interactive Storage Media), an MMM (Multimedia Mailing), a WMM (Wireless Multimedia), an ATM, etc., an RES (Remote Emergency System), and an RVS (Remote Video Surveillance, etc.

In order to support an existing application and an next generation application, a video coding technique is needed so that a user communicates with a desired destination in a predetermined video region, searches and accesses a desired destination and edits the same.

Namely, the MPEG-IV which is to be completed in 1999 as a new video and audio coding technique is basically directed to satisfying the above-described desires.

FIG. 1 illustrates the construction of a video coding unit for an MPEG-IV, which has different construction from H.261, H.263, MPEG-I, and MPEG-II which are international standards for a video coding technique.

Namely, the video coding unit of the MPEG-IV is directed to estimating a motion by the macro block unit as a VOP with respect to an object video formed by a VOP formation unit 10 is inputted into a motion estimation unit 11.

In addition, the motion information estimated by the motion estimation unit 11 is inputted into a motion compensation unit 12, thus compensating the motion.

The VOP the motion of which is compensated by the motion compensation unit 12 is inputted into a subtractor 13 together with a VOP formed by the VOP formation unit 10, thus measuring a difference value therebetween, and the thusly measured difference value by the subtractor 13 is inputted into a video signal coding unit 14, so that a video signal of an object is coded by the sub-block unit of a macro block.

For example, the video signal coding unit 14 splits the X-axis and Y-axis of a macro block into 8×8 sub-blocks each having 8 pixels, thus coding the video signal of the object.

In addition, the VOP the motion of which is compensated by the motion compensation unit 12 and an internal information of an object coded by the video signal coding unit 14 are inputted into an adder 15, and an output signal from the adder 15 is inputted into a previously reconstructed VOP 16, thus detecting a VOP of a previous display.

The VOP of the previous display detected by the VOP detection unit 16 is inputted into the motion estimation unit 11 and the motion compensation unit 12 and is used for a motion estimation and motion compensation.

The VOP formed by the VOP formation unit 10 is inputted into a shape information coding unit 17, and then the shape information is coded.

Here, the output signal from the shape information coding unit 17 is determined based on the applicable field of the VOP coding unit. The output signal from the shape information coding unit 17 is inputted into the motion estimation unit 11, the motion compensation unit 12, and the video signal coding unit 14, respectively, and then is used for coding the internal information of the motion compensation and object.

In addition, the motion information estimated by the motion estimation unit 11, the internal information of an object coded by the video signal coding unit 14 and the shape information coded by the shape information coding unit 17 are multiplexed by a multiplexor 18, and then are transmitted in a bit stream through a buffer 19.

In the video coding unit for an MPEG-IV, a shape coding unit and a video object plane are used.

Here, the VOP denotes an object on a time-based axis of a content having a predetermined shape that a user can accesses and edit. The VOP is coded by the VOP for supporting a content-based functionality.

FIG. 2 illustrates a video formed of an object, which video is reconstructed by macro blocks formed of 16×16 pixels for a video coding.

When the block is thusly reconstructed into macro blocks, there exist three kinds of macro blocks as shown in FIG. 3. Namely, there are an intra-object macro block formed of an intra-object information, an extra-object not having an information of the object, and an object boundary macro block partially having an intra-object information.

FIG. 4 illustrates an arrangement of a luminance block and a color block. The intra-object macro block is formed of blocks of the object, and the extra-object macro block is formed of extra-object blocks.

However, in the object boundary macro block, there may exist three kinds of blocks each being formed of 8×8 pixels having the same characteristic as the macro block as shown in FIG. 5 such as an intra-object sub-block, an extra-object sub-block, and an object boundary sub-block.

FIG. 6 illustrates a conventional video signal coding unit 14 (VM5.0). In the coding unit 14, there are provided an extra-object region padding unit 14a for receiving an inter-video information or an original information from the motion compensation unit 12 and the VOP formation unit 10 as shown in FIG. 1 and a padding shape information (for example, an original video shape information and a recovered shape information) from the shape information coding unit 17 and padding the extra-object region, a DCT and coding unit 14b for DCT-coding the signal from the extra-object region padding unit 14a and outputting a signal information, and an IDCT and decoding unit 14c for IDCT-decoding the signal from the DCT and decoding unit 14b and outputting a decoded information to the previous VOP detection unit 16.

In order to decode the intra-video and inter-video information of the object boundary block, the pixel value of pixels in the extra-object region is first determined. Here, this intra-video signal (intra-texture data) and an error signal (residual texture data) are called a texture information.

Among the techniques, there are known a mean value replacement technique which is directed to filling a mean value of a video information into an object of a block, a zero padding technique which is directed to filling a zero value, a repetitive padding technique using an object boundary information, a shape adaptive DCT technique which does not care with respect to the extra-object information.

However, the intra-video and inter-video has a space surplus having a high relationship in the space. The recently introduced techniques are used by DCT-quantizing the space surplus in the block. However, these techniques do not use the space surplus between inter-blocks.

If the techniques use the space surplus existing between the blocks, it is possible to increase a coding efficiency.

When merging different video blocks padded in various padding techniques, a high frequency component may occur at the video boundary portion. Therefore, a proper padding technique which may increase a coding efficiency is needed.

The conventional padding techniques will be explained with reference to the conventional video signal coding unit 14 (VM5.0).

The mean value replacement technique is directed to filling the mean value of the intra-object pixel value of the intra-lock block in order to code the intra-video and inter-video information in the object boundary block of the object boundary macro block, and then the coding step is performed by using a DCT (Discrete Cosine Transform).

The mean value replacement technique is performed as shown in FIG. 7A. In the drawings, reference numeral 20 denotes a separator, 21 denotes a mean value calculator, and 22 denotes a selector.

The mean value "a" of the intra-object pixel in the object boundary block is computed, and the extra-object pixel value is replaced with "a", and then the coding step is performed by using the DCT.

Next, in the zero padding technique, the extra-object pixel value is filled with a zero value and then the coding step is performed by using a DCT in order to code the video information and an estimation error information in the object boundary block in the object boundary macro block.

In the zero padding technique, as shown in FIG. 7A, a white pixel which is an extra-object pixel in the object boundary block is replaced with a zero value, and then the coding step is performed by using the DCT. This technique is adapted for a coding step between inter-videos from 2.0 to 7.0 of the MPEG-IV VM vision.

In addition, the repetitive padding technique uses a reproduced shape information and includes five steps. Each step will now be explained with reference to FIG. 7B.

(1) The extra-object pixel value in the object boundary block is considered to have a zero value.

(2) The object boundary block is horizontally scanned. At this time, there may exist two kinds of horizontal lines.

Namely, there are a zero segment which is formed of zero value and a non-zero segment which is formed of non-zero value.

If there is a non-segment in the scanned horizontal line or there is only a non-zero segment, no step is performed. Thereafter, the horizontal line is scanned. If a zero segment exists between the block and the non-zero segment, the pixels of the zero segment is filled with an end pixel value of the non-zero segment which contacts with the zero segment. If the zero segment exists between the non-zero segments, the pixel is filled with a mean value of the end pixel value of the non-segment which contacts with the zero-segment.

(3) The object boundary block is scanned in the vertical direction, and then the steps of (2) are performed.

(4) If the extra-object pixels are filled in (2) and (3), the mean value between two values are filled thereinto.

(5) After the (1) through (4) are performed, the extra-object pixels which are not filled thereinto are horizontally scanned, and then the nearest pixel which does not have zero value is searched, and the distance is identical, the left-side pixel value which is not zero is fixed, and the steps are vertically performed. If the distance is identical, the upper-side pixel value which is not zero is fixed, and the mean value between two values is replaced with the value.

FIG. 7B illustrates a result of the above-described steps. The result is used for an intra-video and inter-video coding step in MPEG-IV VM1.0 and is used for the inter-video coding step of VM2.0 through 4.0.

In addition, the LPE(Low Pass Extrapolation) technique, as shown in FIG. 7C, includes a separator 20, a calculator 21, a selector 22, and a filter 23. A mean value of a video information in the block is obtained through the mean calculator 28 when the block to be coded is an object boundary block, and then the value "M" is filled into the pixels of the extra-object region, and the intra-object pixel values among the upper, lower, left-side and right-side pixels are added with respect to each pixel filled with the intra-object mean value are added, and the thusly added value is divided by the intra-object pixel number, and then the pixel value is replaced therewith.

For example, as shown in FIG. 7C, f1 is replaced with the lower-side intra-pixel value, f2 is replaced with a right-side intra-object pixel value, and f4 is replaced with a lower-side and right-side mean value.

In the LPE technique, in order code the video information of the object boundary block in the macro block, the extra-object pixel is filled with a mean value of the intra-block object pixel value in the block, and then the extra-object boundary pixels before the DCT step is filled with a mean value of the pixel values neighboring in four directions.

When there is an extra-object pixel in the pixels neighboring four-direction, the pixel value is excluded, and then the mean value of the intra-object pixel is obtained.

In addition, as shown in FIG. 7C, only the pixels between f1 through f9 become pixels which are replaced with the mean value of the intra-object pixel values neighboring in four-direction.

Thereafter, the DCT is used and codes the block. Currently, the LPE technique is adapted for performing the intra-video coding for the MPEG-IV VM5.0.

In addition, the DCT technique (SADCT: Shape Adaptive Discrete Cosine Transform Technique) is adapted to an object boundary block of a predetermined shaped VOP.

When a video coding step is performed based on a predetermined shaped VOP, differently from a method for replacing the pixel values which are not defined with respect to the extra-object pixel with a proper value, the coding step is performed through a coding and quantizing step by using only the intra-object information.

After the DCT is performed, the DCT coefficient has the same characteristic as the pixel number.

As shown in FIG. 7D, when the intra-object information such as "A" exists, the intra-video and inter-information is moved in the upper direction like "B", and then a one-dimensional DCT is performed in the vertical direction, and the DCT coefficient formed line "C" is moved in the left side direction line "D", and then a one-dimensional DCT is performed in the horizontal direction like "E".

After the step is performed with respect to "E", the SADCT coefficient is formed like "F", and the DCT coefficient after the SADCT is quantized, and a zig-zag scanning is performed with respect thereto. In addition, an adaptive scanning technique is performed with respect to the region in which a coefficient does not exist.

The coefficient values scanned along the adaptive scanning are coded by using the conventional VLC table and is adapted as a selection technique of an intra-video and inter-video coding in a range of MPEG-IV VM5.0 through VM7.0.

However, the above-described techniques has disadvantages in that a coding efficiency is significantly degraded because the space surplus which exists in the block is not used even when the space surplus in the block is properly used through the DCT and quantization.

SUMMARY OF THE INVENTION

Accordingly, it is an object of the present invention to provide a video information coding method using an object boundary merging/splitting technique which overcomes the aforementioned problems encountered in the conventional art.

It is another object of the present invention to provide an improved video information coding method for an object boundary block merging/splitting technique which makes it possible to use an object boundary block merging and a merging/separation as a reverse process thereof which are capable of enhancing a coding efficiency by using a space surplus of an intra-video and inter-video which exist in a block or a neighboring block by merging, coding and transmitting the BBM.

It is another object of the present invention to provide an improved video information coding method for an object boundary block merging/splitting technique which makes it possible to reducing a processing time through a skip with respect to a backward step and enhance a coding efficiency without causing a complexity when configuring the system by adapting a merging technique with respect to a merging and coding step based on three modes such as horizontal, vertical, and diagonal merging steps with respect to an object boundary block for a coding step and separating the object boundary block merged through the merging step and its reverse step.

It is another object of the present invention to provide an improved video information coding method for an object boundary block merging/splitting technique which makes it possible to increase a coding efficiency such as DCT, etc. by providing a new padding technique with respect to the extra-object pixel when merging different object boundary blocks.

To achieve the above objects, there is provided a video information coding method using an object boundary block merging/splitting technique according to a first embodiment of the present invention which includes the steps of merging a plurality of object boundary objects, judging whether there is an overlapped block signal among the block signals using shape information of the object boundary blocks, and merging the blocks in which no overlapped block pixels exist as a result of the judgement, when coding a texture information (intra texture data and residual texture data) signal using a shape information wherein a video information coding system is implemented based on a shape information.

To achieve the above objects, there is provided a video information coding method using an object boundary block merging/splitting technique according to a second embodiment of the present invention which includes the steps of a horizontal merging step for merging a texture information block in a horizontal direction and finishing the merging step when there is no overlapped block by using the shape information of the blocks, a vertical merging step for merging a texture information block in a vertical direction and finishing the merging step when there is no overlapped block by using the shape information of the blocks, and a diagonal merging step for merging a texture information block in a diagonal direction and finishing the merging step when there is no overlapped block by using the shape information of the blocks, wherein said merging steps may be sequentially performed in random order, and remaining merging steps are not performed when there is a merged block, and said merging steps are performed by the macro block unit, when coding a texture information (intra texture data and residual texture data) signal using a shape information wherein a video information coding system is implemented based on a shape information.

To achieve the above objects, there is provided a video information coding method using an object boundary block merging/splitting technique according to a third embodiment of the present invention which includes the steps of merging a plurality of object boundary blocks, judging whether there is an overlapped block signal by using shape information of the object boundary blocks, and not merging the blocks having an overlapped block pixel as a result of the judgement, and merging shape information blocks, judging whether there is a merged block by checking whether there is an overlapped block signal, splitting a merged block by using a shape information when there is a merged block as a result of the judgement, and recovering the merged block to an original block, when coding/decoding a plurality of object boundary blocks having a texture information (intra texture data and residual texture data) signal using a shape information wherein a video information coding system is implemented based on a shape information.

To achieve the above objects, there is provided a video information coding method using an object boundary block merging/splitting technique according to a fourth embodiment of the present invention which includes the steps of merging texture information blocks in a horizontal direction, judging whether the blocks are overlapped by using shape information of the blocks, and finishing the merging step when there is no an overlapped block, merging texture information blocks in a vertical direction, judging whether the blocks are overlapped by using shape information of the blocks, and finishing the merging step when there is no an overlapped block, merging texture information blocks in a diagonal direction, judging whether the blocks are overlapped by using shape information of the blocks, and finishing the merging step when there is no an overlapped block, sequentially performing the above three merging steps in random order, and terminating the remaining merging steps, a horizontal splitting step in which a horizontal direction texture information block is split with reference to the shape information and the block is recovered to an original block when there is no an overlapped block by judging whether there is an overlapped block by using the shape information, a vertical splitting step in which a vertical direction texture information block is split with reference to the shape information and the block is recovered to an original block when there is no an overlapped block by judging whether there is an overlapped block by using the shape information, and a diagonal splitting step in which a diagonal direction texture information block is split with reference to the shape information and the block is recovered to an original block when there is no an overlapped block by judging whether there is an overlapped block by using the shape information, wherein the above three splitting steps are sequentially performed in random order, and the remaining splitting steps are not performed when there is a split block, and the above three splitting steps are performed by the macro block unit, when coding/decoding a plurality of object boundary blocks having a texture information (intra texture data and residual texture data) signal using a shape information wherein a video information coding system is implemented based on a shape information.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7C is a detailed block diagram illustrating a padding unit in a predetermined object except for an object region in the conventional art;

FIGS. 13A–13I are views illustrating a process of controlling and merging a shape information in a block according to the present invention;

DETAILED DESCRIPTION OF THE INVENTION

The embodiments according to the present invention which are adapted to a luminance block will now be explained based on a 180° rotation and three modes of a shape information.

Figure 1:
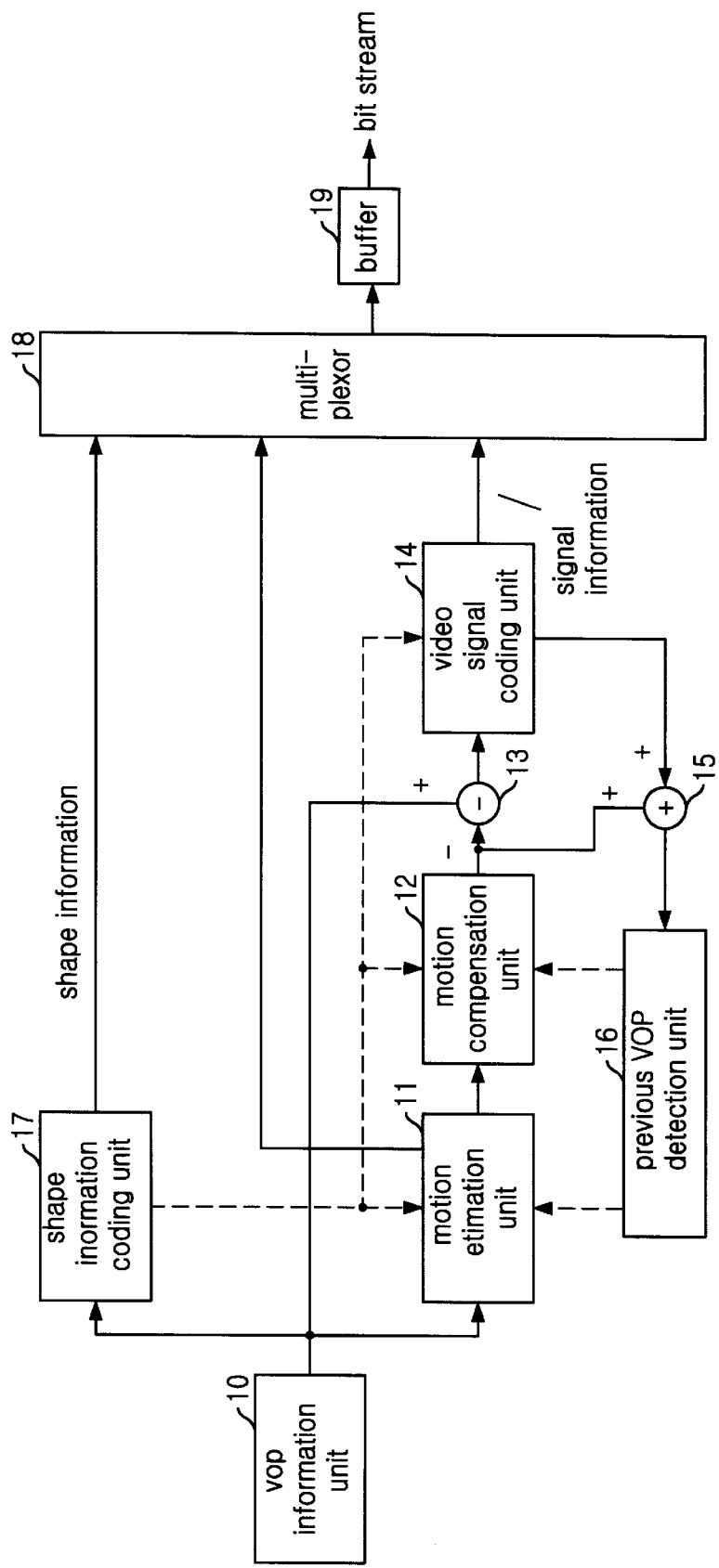
FIG. 1 is a block diagram illustrating a conventional MPEG-IV VOP (Video Object Plane) coding unit.
Figure 2:
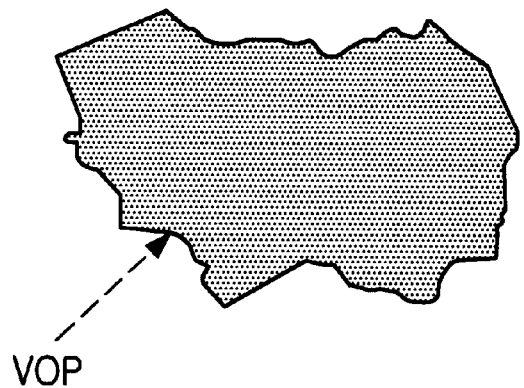
FIG. 2 is a view illustrating a VOP for coding a predetermined object in the conventional art.
Figure 3:
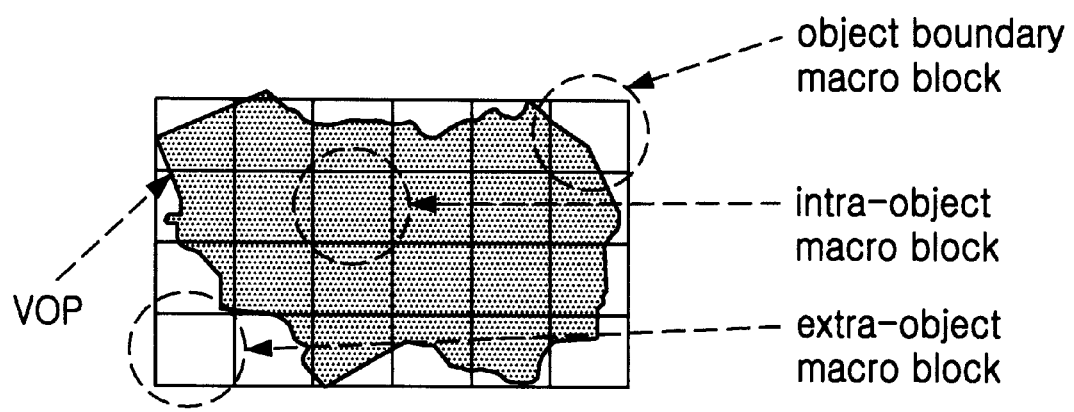
FIG. 3 is a view illustrating a kind of a macro block of a VOP video in the conventional art.
Figure 8:
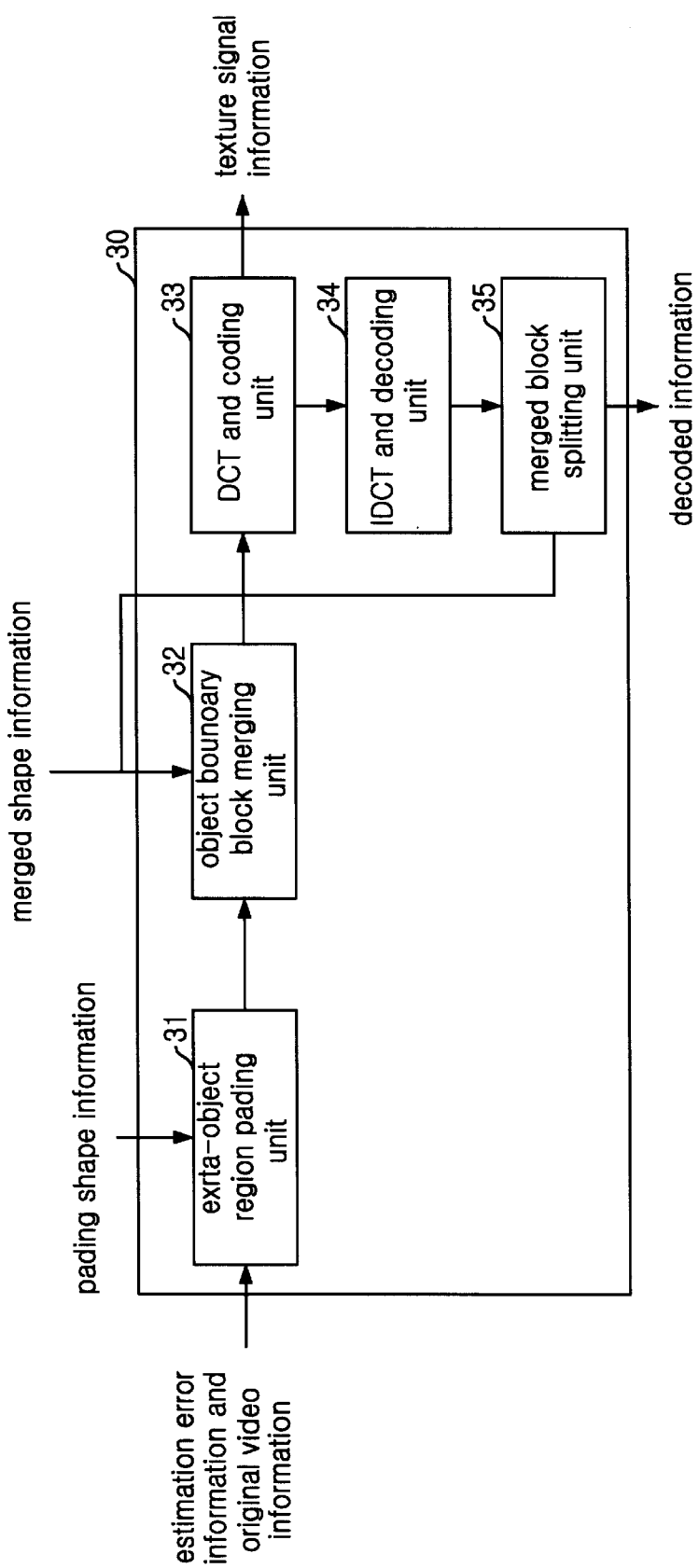
FIG. 8 is a block diagram illustrating a video information coding unit according to the present invention.

First, as shown in FIG. 8, the video information coding unit 30 includes an extra-object region padding unit 31 for receiving an inter-video information or an original video information from the motion compensation unit 12 and the VOP formation unit 10 as shown in FIG. 1, receiving a padding shape information from the shape information coding unit 17, and padding an extra-object region, an object boundary block merging unit 32 for merging an object boundary block based on the signal from the extra-object region padding unit 31 and the merging shape information, a DCT and coding unit 33 for DCT-coding the signal from the object boundary block merging unit 32 and outputting a signal information to the multiplexor, an IDCT and decoding unit 34 for IDCT-decoding the signal from the DCT and decoding unit 33, and a block separation unit 35 for separating the merged block from the recovered shape information and IDCT and decoding unit 34 and outputting the decoded information to the previous VOP detection unit.

Here, the merged block denotes two blocks one of which has signals and the other of which does not have signals. In addition, an object has a predetermined shape information, not a background video information to be coded.

The object boundary block merging (BBM: Boundary Block Merge) and the object boundary block splitting (BBS:

Boundary Block Split) techniques are applicable to the video signal coding unit 14 as shown in FIG. 1 and are directed to using a space surplus of an intra-block and neighboring block of a video information and an inter-video information.

In particular, the object boundary block splitting technique is a technique for accurately displaying a video reconstructed after the decoding step. At this time, the above-described two techniques use a shape information reconstructed after the decoding step of a shape information and are adapted to a luminance information.

In addition, in the present invention, there are provided a padding unit connected before a BBM unit, a BBM unit, and a BBS unit. The padding unit connected before the BBM unit receives a shape information (VM.7X) coded and decoded by the shape information coding unit and an original shape information (VM7.0), and the video information is processed by the block unit based on the original video shape information or the recovered shape information input, and the inter-video information is used for an LPE padding technique, and the inter-video information is used for a zero padding.

Figure 9A:
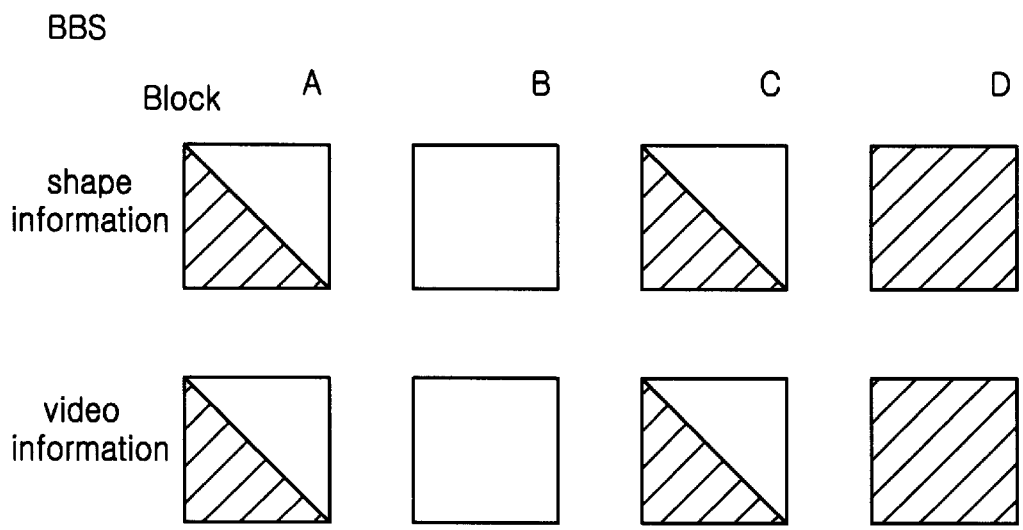
FIGS. 9A through 9C are views illustrating a padding before a BBM, a BBM, and a BBS according to the present invention.
Figure 9B:
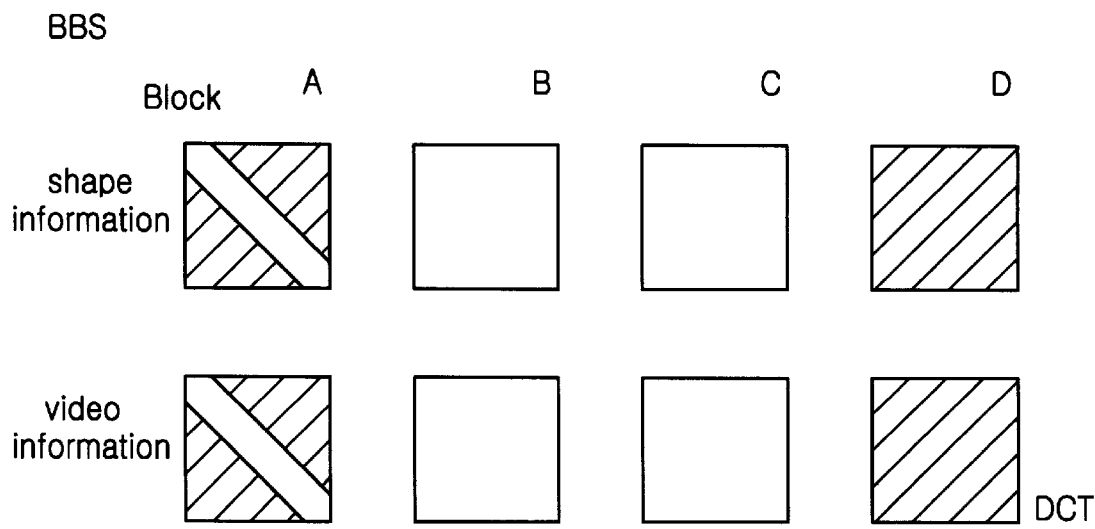

The BBM receives a shape information and an original video information coded, decoded and then reconstructed by the shape information coding unit, and performs a merging step with respect to a shape information and a video information as shown in FIG. 9B by using a shape information.

Thereafter, the block to be merged like "C" as shown in FIG. 9B is changed to an extra-object block, and the block merged like "A" is replaced with the video information with a mean value using a pixel value of an extra-object region replaced with the passing value of the blocks "A" and "C" with respect to the pixels of the extra-object region outside the merged shape information.

Figure 9C:
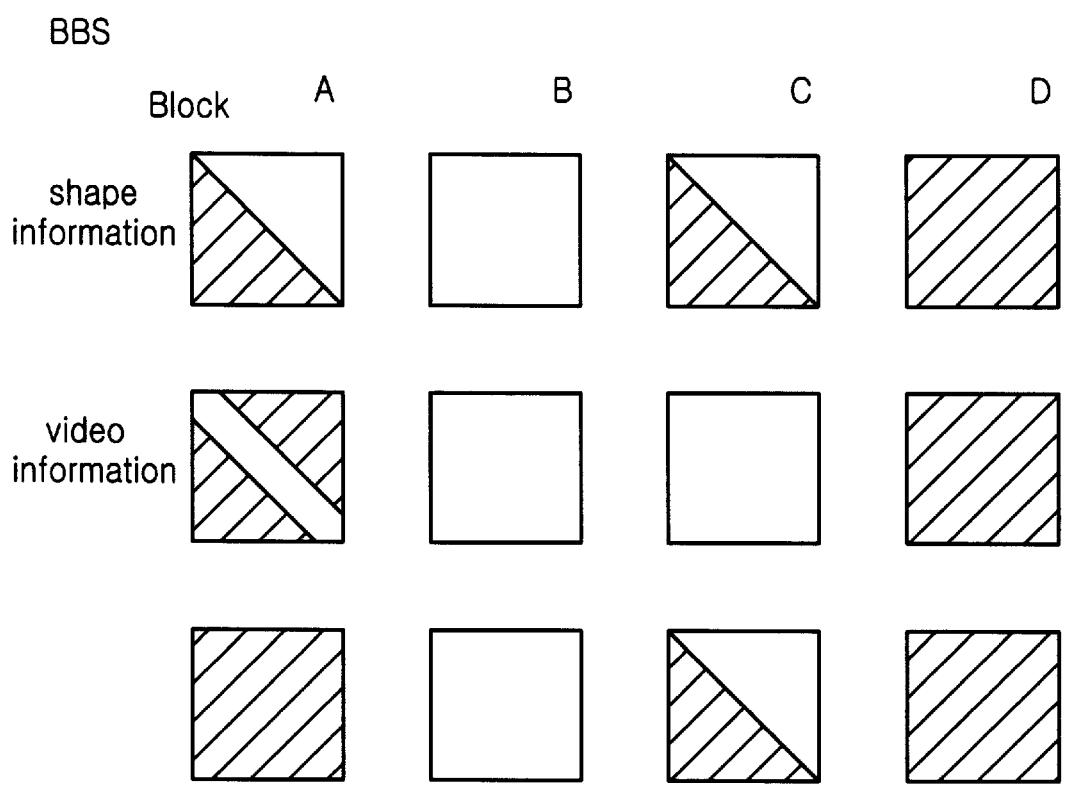

In addition, the BBS receives a shape information coded and reconstructed by the input shape information coding unit and a video information decoded and recovered after the BBM, scans a block coded in a merged state among the recovered blocks by using a shape information and splits, as shown in FIG. 9C, a video information recovered by using the input information of the shape information before the merging step.

Figure 10A:
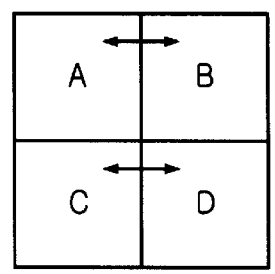
FIG. 10 is a view illustrating an embodiment of adopting three models of a luminance block arrangement and BBM/BBS in a macro block according to the present invention.
Figure 10B:
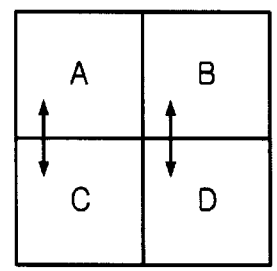
Figure 10C:
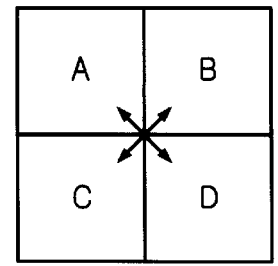
Figure 11A:
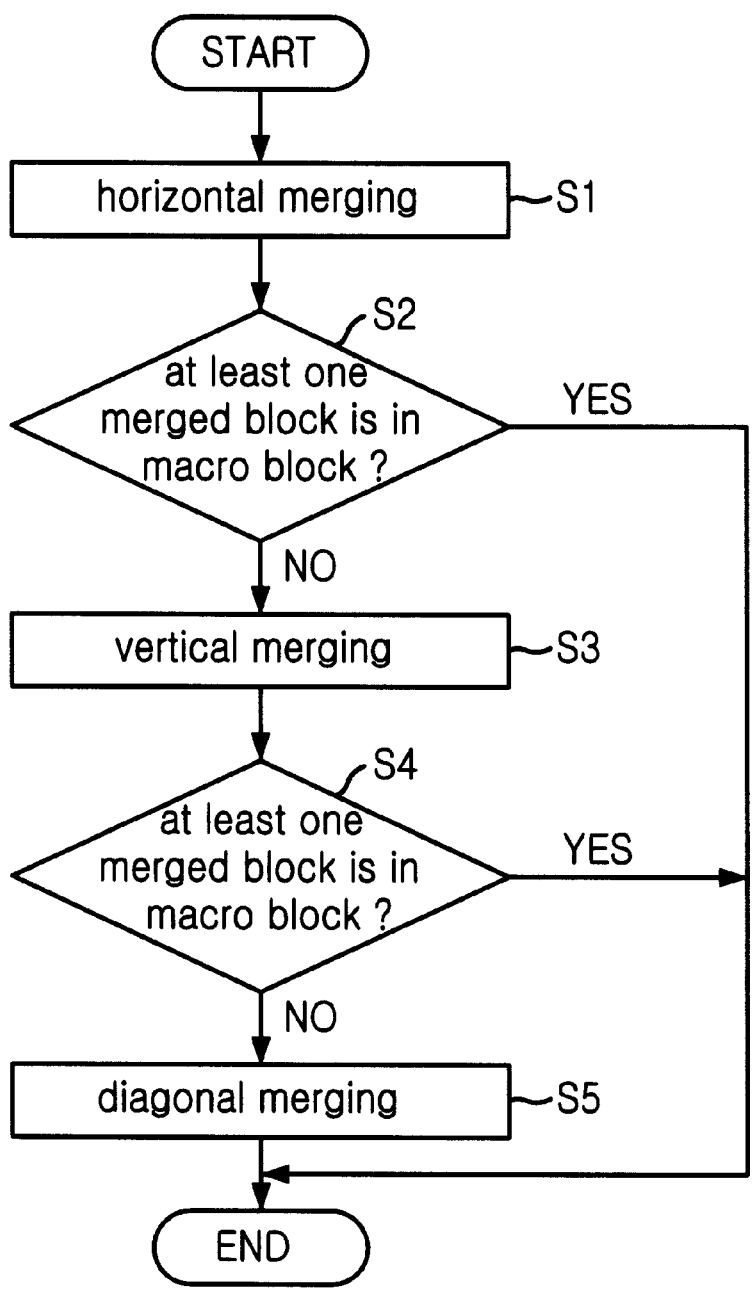
FIG. 11A is a flow chart illustrating a BBM adopting three models according to the present invention.
Figure 11B:
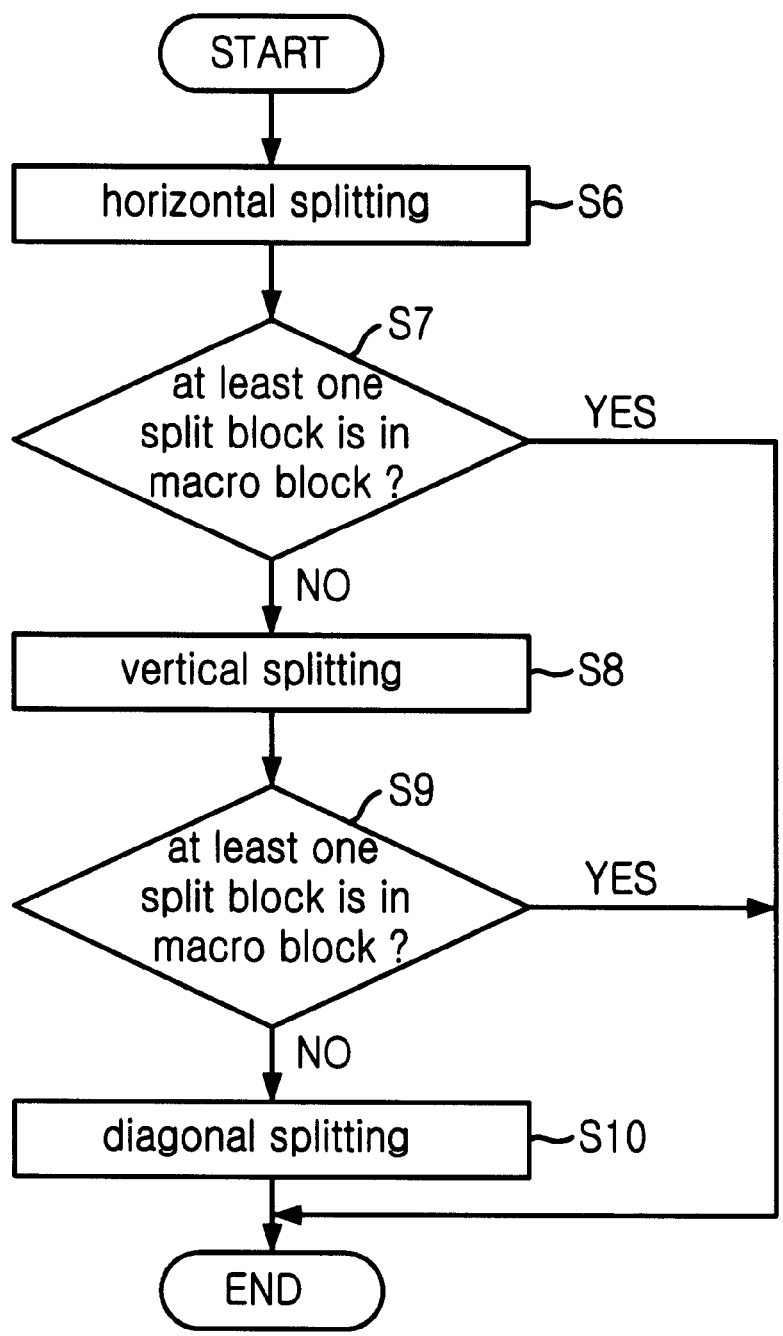
FIG. 11B is a flow chart illustrating a BBS adopting three models according to the present invention.
Figure 12:
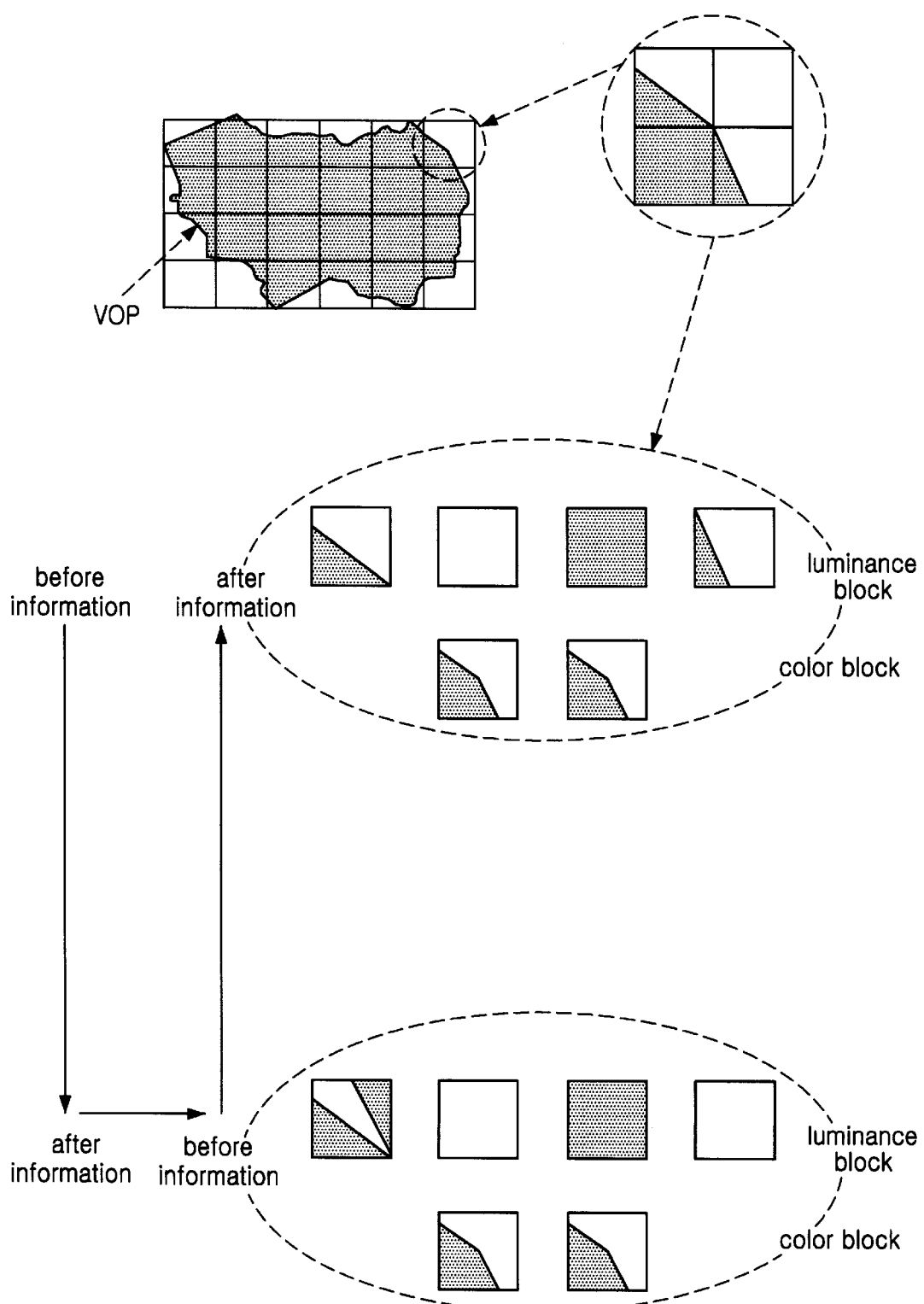
FIG. 12 is a view illustrating an embodiment of adopting a BBM/BBS to a luminance block according to the present invention.

First, the object boundary block merging (BBM) technique is classified as follows: A horizontal merging technique as shown in FIG. 10A, a vertical merging technique as shown in FIG. 10B, and a diagonal direction merging technique as shown in FIG. 10C. FIG. 11A is a flow chart illustrating a BBM adopting three models according to the present invention, FIG. 11B is a flow chart illustrating a BBS adopting three models according to the present invention, and FIG. 12 is a view illustrating an embodiment of adopting a BBM/BBS to a luminance block according to the present invention.

Here, a shape information is merged for an overlapped state judgement, and the BBM and BBS are not merged and transmitted. The same are used only for a texture information merging.

In addition, the BBM and BBS can be performed at the transmission terminal. Only the BBS is performed at the receiving terminal.

As shown in FIG. 11A, after a horizontal merging step is performed in Step S1, it is judged whether at least one merged block exists in a macro block in Step S2. As a result of the judgement, if there is not a merged block, a vertical merging step is performed in Step S3. Thereafter, it is judged whether at least one merged block exists in a macro block. As a result of the judgement, if there is not a merged block, a diagonal merging step is performed in Step S5.

In this embodiment of the present invention, the merging step is performed as follows: The horizontal merging→the vertical merging→the diagonal merging. The merging step may be preferably performed as follows: The horizontal merging→the diagonal merging→the vertical merging, or the vertical merging→the horizontal merging→the diagonal merging, or the vertical merging→the diagonal merging→the horizontal merging, or the diagonal merging→vertical merging→the horizontal merging, or the diagonal merging→the horizontal merging→the vertical merging.

Among the above-described merging steps, the horizontal merging will now be explained with reference to FIG. 10A.

In a first step, if a block A and block B relate to an object boundary block, and there is no overlapped block pixel between the block which is obtained by rotating the block B by 180° and the block A, the object and shape information which is obtained by rotating the block B by 180° is merged with the block A, and the block B is changed to an extra-object block.

At this time, the block transparentized into the extra-object block denotes a block in which the merging result signal is moved and there is not texture information.

In a second step, if the block C and block D relate to the object boundary block, and there is no object pixel in the block which is obtained by rotating the block D by 180° and the block C, the object and shape information which is obtained by rotating the block D by 180° with the block C, and then the block D is changed to an extra-object block.

If there is more than an object boundary block merged by the horizontal merging technique, the vertical merging and diagonal direction merging are skipped, and if there is not object boundary block merged by the horizontal merging technique, the vertical merging step is performed.

Next, the vertical merging step will now be explained with reference to FIG. 10B.

In a first step, if the block A and block C relate to an object boundary block, and there is no overlapped block pixel between the block which is obtained by rotating the block C by 180° and the block A, the object and shape information which is obtained by rotating the block C by 180° is merged with the block A, and the block C is changed to an extra-object block.

In a second step, if the block B and block D relate to the object boundary block, and there is no object pixel in the block which is obtained by rotating the block D by 180° and the block B, the object and shape information which is obtained by rotating the block D by 180° with the block B, and then the block D is changed to an extra-object block.

If there is more than an object boundary block merged by the vertical merging technique, the diagonal merging is skipped, and if there is not object boundary block merged by the vertical merging technique, the diagonal merging step is performed.

Next, the diagonal merging step will now be explained with reference to FIG. 10C.

In a first step, if the block A and block D relate to an object boundary block, and there is no overlapped block pixel between the block which is obtained by rotating the block D by 180° and the block A, the object and shape information which is obtained by rotating the block D by 180° is merged with the block A, and the block D is changed to an extra-object block.

In a second step, if the block B and block C relate to the object boundary block, and there is no object pixel in the block which is obtained by rotating the block C by 180° and the block B, the object and shape information which is obtained by rotating the block C by 180° with the block B, and then the block D is changed to an extra-object block.

If there is formed a block merged by the object boundary block merging technique, the pixel values with respect to the extra-object pixel in the merged block are determined by using the pixel values determined in the merged block.

At this time, as the shape information, a shape information of an original video or a recovered shape information may be used.

As shown in FIG. 10A, assuming that the extra-object pixel value before merging the block A formed of the merged blocks is called "a", the extra-object pixel value before merging the block B is called "b", the number of the intra-object pixel is called "num_a", and the number of the intra-object pixels in the block B is called "num_b", when the blocks A and B are merged, a predetermined value of "aX num_a+bX num_b)/(num_a+num_b) is determined and then the padding is performed.

In addition, when two object boundary blocks A and B are merged, a mean value of (a+b)/2 is determined for a re-padding step, and then the extra-object pixel is padded.

Figure 14:
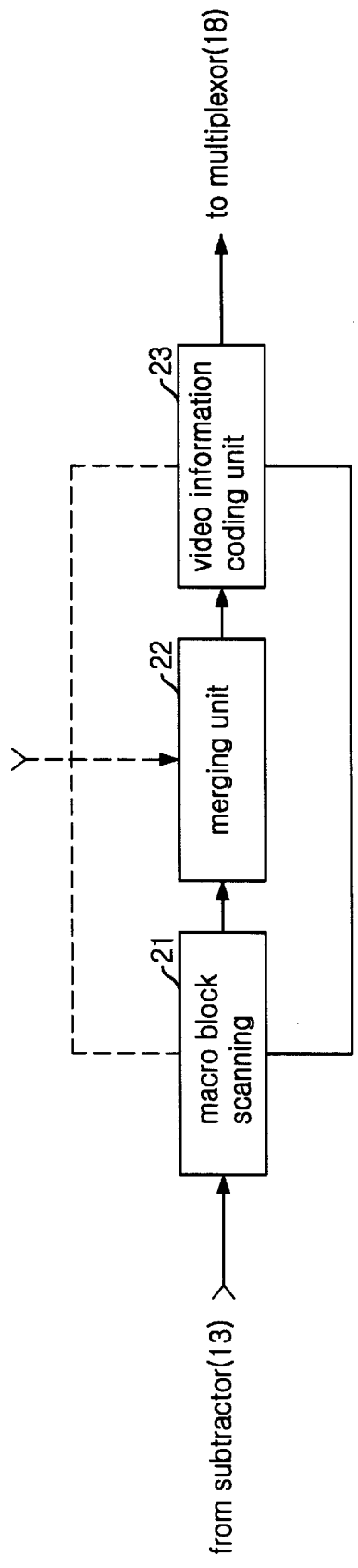
FIG. 14 is a block diagram illustrating an embodiment which is adopted to only a macro block unit according to the present invention.

The coding step using a merging of the object boundary sub-block will now be explained in a state that the merging condition is not coded as shown in FIGS. 12, 13 and 14 wherein a first object boundary sub-block is not adapted. Namely, the adaption to the second object boundary sub-block will now be explained.

As shown in FIG. 12, the luminance block is merged with another luminance block with respect to four luminance blocks and two color blocks in the object boundary block, and the color block is merged with another block, or the luminance block is merged with the color block is merged and then is coded, respectively.

As shown in FIG. 12, the first luminance block, the fourth luminance block, the first color block and the second color block are called an object boundary sub-block.

As shown in FIG. 12, the luminance block is merged with another luminance block, and the color block is merged with another color block. In addition, as shown in FIG. 13, when a sub-block is defined as a luminance block, only the luminance block is adapted, and the merging condition is used without defining the luminance block and the color block.

In the above-described two cases, the merging condition is adapted to the object boundary sub-block after the second block among the object boundary sub-blocks.

If there is no overlapped block pixel between the object boundary sub-block to which the merging condition is adapted and the first object boundary sub-block, one coding block is formed based on the non-coded first object boundary sub-block and the block information to which the merging condition is adapted.

Namely, as shown in FIG. 13, assuming that there are two sub-blocks, the second sub-block as shown in "a" of FIG. 13 is rotated by 180° as shown in "c" of FIG. 13, and then is merged with the sub-block as shown in "a" of FIG. 13 in such a manner as shown in "d" of FIG. 13. The sub-block as shown in "b" of FIG. 13 is made symmetrical in the diagonal direction as shown in "a" of FIG. 13 and then is merged with a sub-block as shown in "a" of FIG. 13 in such a manner as shown in "f" of FIG. 13.

In addition, as shown in "g" of FIG. 13, the sub-block is rotated by 90° in the clockwise direction, or is rotated in the counterclockwise direction as shown in "h" of FIG. 13, or is made symmetrical to the vertical center line as shown in "i" of FIG. 13, or is made symmetrical to the horizontal direction (not shown). Thereafter, the merging step is performed under condition that the shape information existing in the sub-block is not overlapped.

Differently from the embodiment as shown in FIG. 13, if the object boundary sub-block which is not coded exists thereafter, the above-described steps are repeated with respect to the merged coding block by adapting the merging condition to the sub-block.

At this time, if there remains a merging condition, the coding block which is formed through the merging step is DCTed.

The above-described steps are repeatedly performed with respect to the object boundary sub-block which does not form the merged coding block.

When the merged coding block is formed, the coding block is coded, and then the DCT step is performed an object boundary sub-block as one coding block which sub-block does not satisfies the merging condition.

Namely, the texture information having an intra-video and inter-video data is merged, coded, and transmitted.

In addition, the object boundary block splitting technique is classified into a horizontal splitting technique "a" as shown in FIG. 10, a vertical splitting technique "b", and a diagonal splitting technique "c".

FIG. 11A is a flow chart illustrating a BBM adopting three models according to the present invention, FIG. 11B is a flow chart illustrating a BBS adopting three models according to the present invention, and FIG. 12 is a view illustrating an embodiment of adopting a BBM/BBS to a luminance block according to the present invention.

The step will now be explained with reference to FIG. 11B.

As shown in FIG. 11B, after a horizontal splitting step is performed in Step S6, it is judged whether at least one split block exists in a macro block in Step S7. As a result of the judgement, if there is not a split block, a vertical splitting step is performed in Step S8. Thereafter, it is judged whether at least one split block exists in a macro block is Step S9. As a result of the judgement, if there is not a split block, a diagonal splitting step is performed in Step S10.

In this embodiment of the present invention, the splitting step is performed as follows: The horizontal splitting→the vertical splitting→the diagonal splitting. The splitting step may be preferably performed as follows: The horizontal splitting→the diagonal splitting→the vertical splitting, or the vertical splitting→the horizontal splitting→the diagonal splitting, or the vertical splitting→the diagonal splitting→the horizontal splitting, or the diagonal splitting→vertical splitting→the horizontal splitting, or the diagonal splitting→the horizontal splitting→the vertical splitting.

Among the above-described splitting steps, the horizontal splitting will now be explained with reference to FIG. 10A.

In a first step, if a block A and block B relate to an object boundary block, and there is no overlapped block pixel between the block which is obtained by rotating the block B by 180° and the block A, the intra-video and inter-video information of the block B which is rotated in the block A by 180° is split, and thusly split information is rotated by 180°, thus forming the block B.

In a second step, if a block C and block D relate to an object boundary block, and there is no overlapped block pixel between the block which is obtained by rotating the block D by 180° and the block A, a video and estimation error information of the block D which is rotated by 180° in the block A is split, and thusly split information is rotated by 180°, thus forming the block D.

If there is more than an object boundary block split by the horizontal splitting technique, the vertical splitting and diagonal direction splitting are skipped, and if there is not object boundary block split by the horizontal splitting technique, the vertical splitting step is performed.

Next, the vertical splitting step will now be explained with reference to FIG. 10B.

In a first step, if a block A and block C relate to an object boundary block, and there is no overlapped block pixel between the block which is obtained by rotating the block C by 180° and the block A, the intra-video and inter-video information of the block C which is rotated in the block A by 180° is split, and thusly split information is rotated by 180°, thus forming the block C.

In a second step, if a block B and block D relate to an object boundary block, and there is no overlapped block pixel between the block which is obtained by rotating the block D by 180° and the block B, a video and estimation error information of the block D which is rotated by 180° in the block B is split, and thusly split information is rotated by 180°, thus forming the block D.

If there is more than an object boundary block split by the vertical splitting technique, the diagonal splitting is skipped, and if there is not object boundary block split by the vertical splitting technique, the diagonal splitting step is performed.

Next, the diagonal splitting step will now be explained with reference to FIG. 10C.

In a first step, if a block A and block D relate to an object boundary block, and there is no overlapped block pixel between the block which is obtained by rotating the block D by 180° and the block A, the intra-video and inter-video information of the block D which is rotated in the block A by 180° is split, and thusly split information is rotated by 180°, thus forming the block D.

In a second step, if a block B and block C relate to an object boundary block, and there is no overlapped block pixel between the block which is obtained by rotating the block C by 180° and the block B, a video and estimation error information of the block C which is rotated by 180° in the block B is split, and thusly split information is rotated by 180°, thus forming the block C.

FIG. 14 illustrates an embodiment adapted to a macro block unit, which includes a macro block scanning unit 21 for blocking the macro block unit to a video merging unit, a merging unit 22 for performing a merging step, and a video information coding unit 23 for coding the merged block and outputting the coded block to the multiplexor 18.

Figure 15:
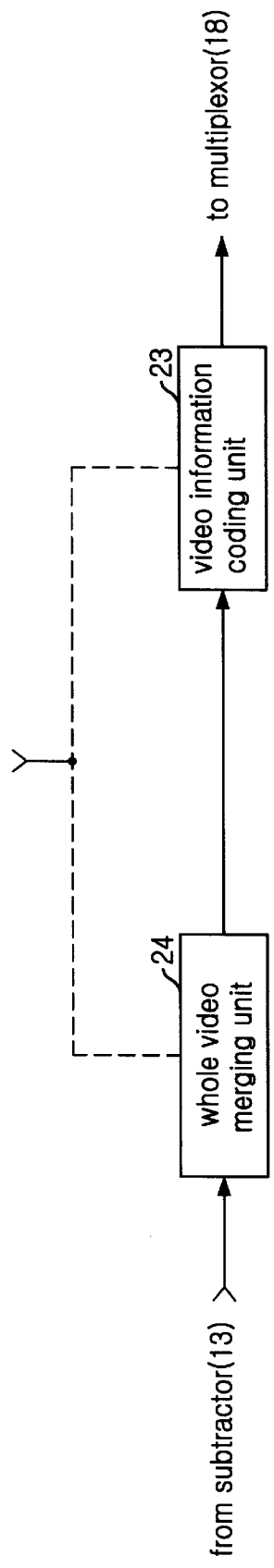
FIG. 15 is a block diagram illustrating an embodiment which is adopted irrespective of a macro block unit with respect to a whole video according to the present invention.

In addition, FIG. 15 illustrates an embodiment which is not limited to a macro block unit for the whole video, which includes a whole video merging unit 24 for performing an merging step with respect to the video of a whole object forming the VOP, and a video information coding unit 23 for coding the non-merged block and the block which is merged by the whole video merging unit 24.

As shown in FIG. 15, in another embodiment of the present invention, the step thereof is limited to the block in the macro block formed the VOP, or the limitation is not provided, and the coding step becomes applicable based on the merging between the object boundary block which is not coded with respect to the whole video the blocks formed in eight directions, namely, upper, lower, left side and right side directions and 45° upper, lower, left side and right side directions.

At this time, the step is not limited in the macro block as well as by the macro block. It is applicable to the coding unit (M×N region, for example, 8×8 blocks) formed at the object boundary block.

Figure 4:
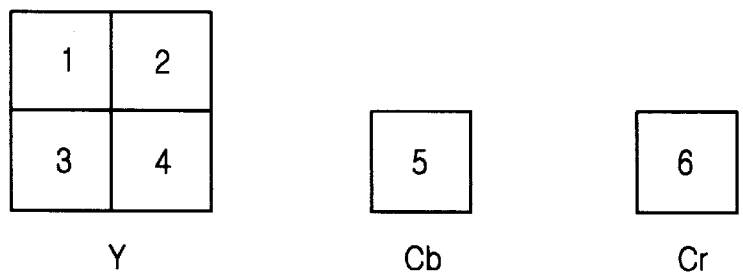
FIG. 4 is a view illustrating the construction of a block of a macro block in the conventional art.
Figure 5:
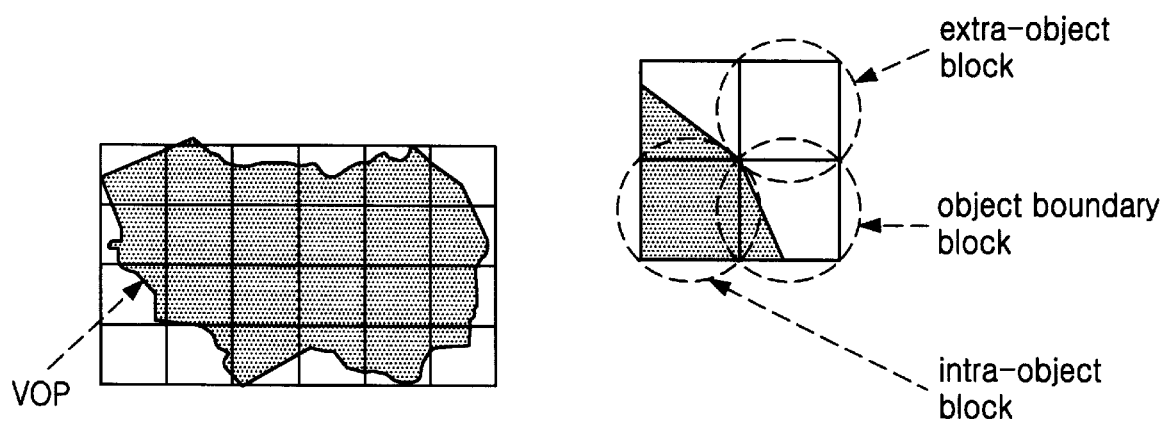
FIG. 5 is a view illustrating a kind of a block of a VOP video in the conventional art.
Figure 6:
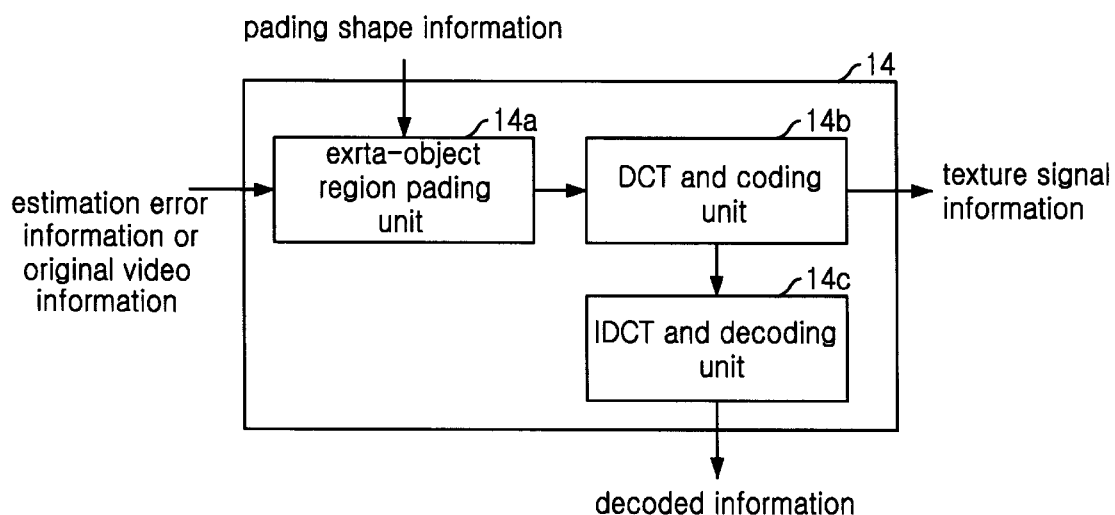
FIG. 6 is a block diagram illustrating a conventional video information coding unit.
Figure 7A:
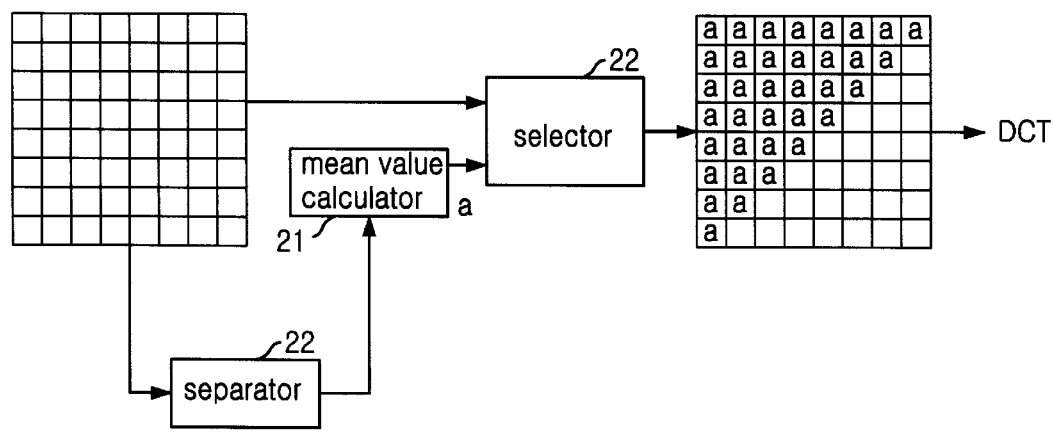
FIG. 7A is a block diagram illustrating a mean value replacement method in the conventional art.
Figure 7B:
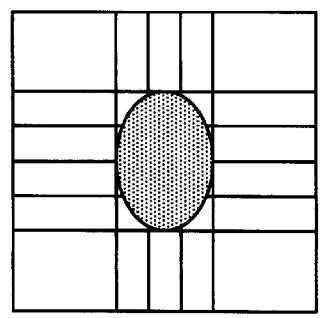
FIG. 7B is a view illustrating a step-by-step result of a repetitive padding method in the conventional art.
Figure 7B:
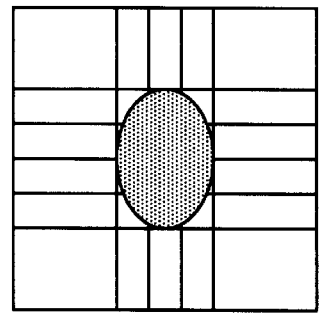
Figure 7B:
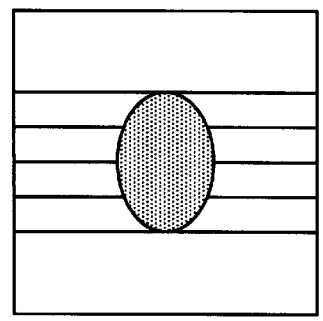
Figure 7B:
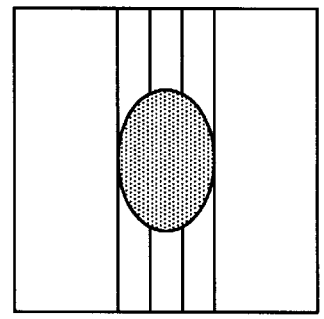
Figure 7F:
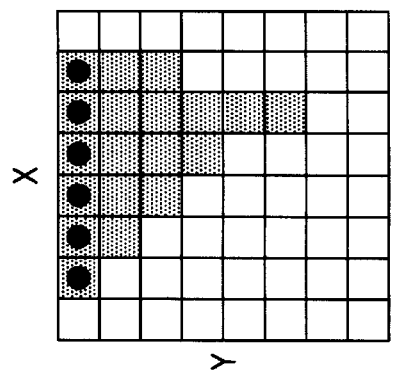
FIGS. 7D–7I are views illustrating a SADCT step with respect to a VOP of a predetermined shape.
Figure 7E:
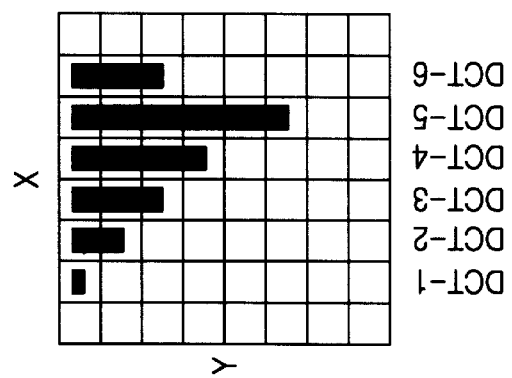
Figure 7D:
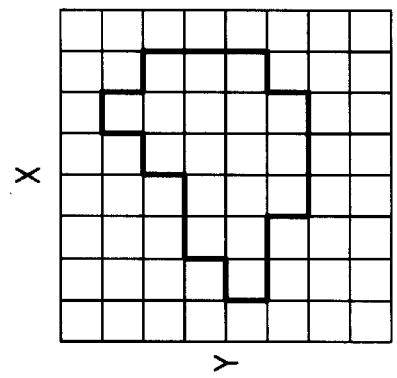
Figure 7I:
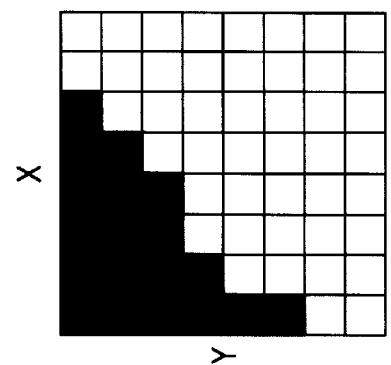
Figure 7H:
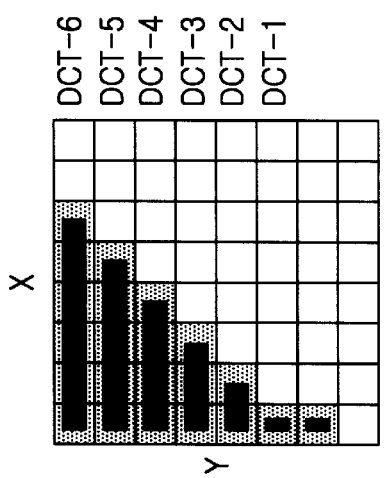
Figure 7G:
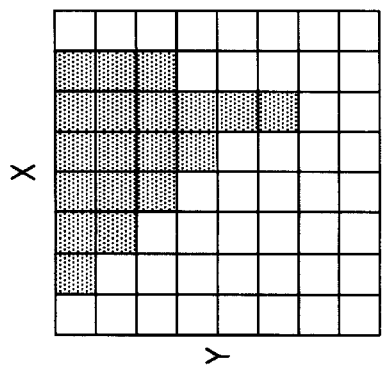

In addition, in another embodiment of the present invention, this embodiment to which a sequential merging method according to the present invention is variously implemented with reference to FIG. 4.

In this embodiment, the luminance block is adapted, and the color block is adapted. In addition, it is applicable irrespective of the luminance block and the color block.

In addition, the number of the blocks to be merged is limited to two object boundary blocks or may be limited to N(N=2, 3, . . . , n). The number of the same may be limitlessly adapted.

The sequential merging method which is adapted to the luminance block and does not limit the number of the blocks will now be explained.

Namely, the object boundary block merging step is sequentially performed with respect to the object boundary block from the block A to the block D. If the block B except the blocks merged with the block A is not merged, the merging step is performed for the block B and the block C. If the block C is not merged, the merging step with the block D is performed by using the blocks of the block C.

At this time, the merging is implemented as follows. (A,B), (A,C), (A,D), (B,C), (B,D), (C,D), (A,B,C), (A,B,D), (B,C,D) (A, B, C, D).

As described above, in the present invention, a technique for obtaining a desired video quality by using a space surplus of an intra-video and inter-video information existing in a block and between the blocks, reducing the coding bit is performed, and it is possible to skip unnecessary steps, thus reducing the time. In addition, since the object boundary block splitting technique is simple used for reconstructing a recovering video and displaying the same. In addition, it is possible to obtain an enhanced characteristic in view of a coding efficiency and time delay without increasing the complexity, thus enhancing the step performance of the system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A video information coding method in which texture information for a plurality of object boundary blocks is coded using a block merging/splitting technique, wherein each object boundary block includes a plurality of pixels by which it is possible to judge an object, each pixel having shape information and coordinated position information, the coding method comprising the steps of:

selecting a first object boundary block and a second object boundary block from the plurality of object boundary blocks;

rotating the pixels of the second object boundary block by 180°;

merging the first object boundary block and the rotated second object boundary block by combining the pixels of the first object boundary block and the rotated pixels of the second object boundary block;

comparing the shape information of the pixels of the first object boundary block and the shape information of the rotated pixels of the second object boundary block in a sequence of the coordinates of the pixels of the first object boundary block and judging whether a corresponding pixel is overlapped with respect to shape information between the first object boundary block and the rotated second object boundary block; and coding the texture information of the merging blocks in which the overlapped shape information does not exist as a result of the judgment.

2. The method of claim 1, wherein said merging step is directed to merging a plurality of object boundary blocks in a vertical direction.

3. The method of claim 1, wherein said merging step is directed to merging a plurality of object boundary blocks in a horizontal direction.

4. The method of claim 1, wherein said merging step is directed to merging a plurality of object boundary blocks in a diagonal direction.

5. The method of claim 1, wherein said merging step is directed to sequentially merging sub-blocks in identical macro blocks.

6. The method of claim 5, further comprising:

padding extra-object pixel values of the object boundary blocks as a predetermined value before the merging step is performed.

7. The method of claim 6, further comprising:

repadding a pixel value with respect to the padded extra-object pixel of the merged block as a predetermined value.

8. The method of claim 5, wherein said padding step is performed by determining an extra-object pixel value of the merged block as a predetermined value after the merging step is performed.

9. The method of claim 8, wherein when two object boundary blocks A and B are merged, a predetermined value for the repadding step is given as follows:

$$(a[X]\times num\_a + b[X]\times num\_b)/(num\_a + num\_b)$$

where "a" denotes the extra-object pixel value before a merging of the block A;

"b" denotes the extra-object pixel value before a merging of the block B;

"num_a" denotes the number of intra-object pixels of the block A; and

"num_b" denotes the number of intra-object pixels of the block B.

10. The method of claim 8, wherein when two object boundary blocks A and B are merged, an extra-object pixel is performed by the following mean value:

$$(a+b)/2[(a+b)/2]$$

where "a" denotes an extra-object pixel value before merging the block "A"; and

"b" denotes an extra-object pixel value before merging the block "B".

11. The method of claim 8, wherein said padding step is performed by determining the extra-object pixel value of the merged block as zero when the extra-object pixels of the object boundary block is zero-padded before the merging step is performed.

12. The method of claim 1, wherein said shape information is directed to using a reconstructed shape information.

* * * * *